United States Patent
Childers et al.

(10) Patent No.: US 6,813,055 B2
(45) Date of Patent: Nov. 2, 2004

(54) OPTICAL BEAM STEERING DEVICE

(75) Inventors: Edwin M. C. Childers, San Diego, CA (US); Richard G. Trissel, Cardiff, CA (US)

(73) Assignee: Fiberyard, Inc., San Diego, CA (US)

( * ) Notice: Subject to any disclaimer, the term of this patent is extended or adjusted under 35 U.S.C. 154(b) by 0 days.

(21) Appl. No.: 10/155,856

(22) Filed: May 24, 2002

(65) Prior Publication Data

US 2003/0020996 A1 Jan. 30, 2003

Related U.S. Application Data

(60) Provisional application No. 60/294,931, filed on May 30, 2001.

(51) Int. Cl.$^7$ ............................................ G02B 26/08
(52) U.S. Cl. ...................... 359/224; 359/198; 359/199
(58) Field of Search ................................ 359/198–199, 359/212–215, 220–221, 223–226, 846, 848, 871–872; 310/36, 40 R, 40 MM, 46, 66

(56) References Cited

U.S. PATENT DOCUMENTS

| | | | |
|---|---|---|---|
| 4,560,925 A | * | 12/1985 | Niven et al. |
| 4,630,254 A | | 12/1986 | Tseng |
| 5,097,355 A | * | 3/1992 | Eden .......................... 359/213 |
| 5,229,593 A | | 7/1993 | Cato |
| 5,367,398 A | | 11/1994 | Ito |
| 5,416,627 A | | 5/1995 | Wilmoth |
| 5,777,332 A | | 7/1998 | Lonn |
| 5,777,768 A | | 7/1998 | Korevaar |
| 6,091,074 A | | 7/2000 | Korevaar |
| 6,118,131 A | | 9/2000 | Korevaar |
| 6,188,502 B1 | * | 2/2001 | Aoki .......................... 359/198 |

* cited by examiner

Primary Examiner—James Phan
(74) Attorney, Agent, or Firm—Nydegger & Associates

(57) ABSTRACT

An actuator for moving the steering mirror of an optical switch is manipulated during the operation of the switch to route light beams along selected paths through free space. Structurally, the mirror has a reflecting surface area that is characterized by a largest dimension of less than fifteen millimeters, and the actuator defines a footprint within this area. The actuator includes a flexible universal pivot that is used to mount the mirror on a base member. The actuator also includes an electronic device that controls the magnetic interaction between a magnet on the mirror and a magnet on the base to selectively move the mirror on the universal pivot for the operation of the optical switch.

17 Claims, 2 Drawing Sheets

OPTICAL BEAM STEERING DEVICE

This application claims the benefit of U.S. Provisional Application No. 60/294,931 filed on May 30, 2001.

FIELD OF THE INVENTION

The present invention pertains generally to optical switches. More particularly, the present invention pertains to steering mirrors that are useful for routing light beams through free space. The present invention is particularly, but not exclusively, useful as an actuator for the steering mirror of an optical switch.

BACKGROUND OF THE INVENTION

It has happened that optical components are being more and more frequently used in the manufacture of data transmission and communications systems. In most instances, these optical components include the use of optical fibers. Typically, these optical fibers have central cores that are made of an ultra-pure glass, and they include a cladding that surrounds the central core. Because the central cores have a higher refractive-index than that of the glass in the outer cladding, optical fibers are capable of conducting modulated light signals by total internal reflection. Further, these fibers can be used to manufacture optical fiber cables that consist of single or multiple cores, and have additional cladding and armoring for mechanical protection. In comparison with other types of signal conductors, the benefits that are obtained by using optical fibers include small diameters, high potential bandwidth and lower cost than more conventional conductors (e.g. copper wires).

Like all other types of communications systems, in order for an optical network to be effective, it must be operationally flexible. Stated differently, the optical system or network must be capable of being configured, and quickly reconfigured, with many different communications pathways. Clearly, this capability requires switches of some kind. In the particular case wherein the optical system incorporates optical fibers, the switches that are to be used must be able to direct a light beam from an end of a transmitting fiber to an end of a receiving fiber. Moreover, for the proper operation of the optical network, the switch may need to select a particular receiving fiber from a plurality of such fibers. Further, the switch may need to quickly redirect the light beam to another receiving fiber and, possibly, sequentially redirect the light beam to a plurality of receiving fibers.

Switches that mechanically align the ends of optical fibers with each other are typically limited in their performance by certain considerations that pertain in general to any type mechanical device. Specifically, these considerations include the fact that mechanical switches can be relatively slow in their operation. Further, due to corrosion and wear, mechanical switches are prone to losing precision in their alignments. Also, and perhaps more importantly, mechanical switches are susceptible to failure from material fatigue. In comparison, the degree to which these same imperfections may pertain to optical switches is much less significant.

It is known that mirrors can be effectively used for purposes of directing light beams on segmented beam paths through free space. Additionally, it is known that beam paths can be routed and rerouted by using only very small movements of a steering mirror. In the context of an optical switch, this fact can be very advantageous. Specifically, when mechanical operations can be limited to only those that are necessary for the proper orientation of a steering mirror, the extent and effect of these movements can be minimized. Accordingly, attention is then more appropriately focused on optical considerations for the optical switch. Included here are considerations of size. In particular, it is appreciated that many applications for optical switches require the switch be small and of minimal size. Insofar as the steering mirror of a switch is concerned, this means that the actuator for moving the mirror must also be small.

In light of the above, it is an object of the present invention to provide an actuator for moving the steering mirror of an optical switch that is compact in size and is, preferably, within the footprint of the mirror. Another object of the present invention is to provide an actuator for moving the steering mirror of an optical switch that is subjected to little, if any, material fatigue. Still another object of the present invention is to provide an actuator for moving the steering mirror of an optical switch that is relatively easy to manufacture, is simple to use and is relatively cost effective.

SUMMARY OF THE PREFERRED EMBODIMENTS

An actuator for moving a mirror, in accordance with the present invention, involves the interaction of electrical, magnetic and mechanical components. Importantly, operation of the actuator results in minimal, if any, material fatigue failure. Further, an important aspect of the present invention is that the actuator is dimensioned to define a footprint that lies completely within an area that is covered by the mirror. As contemplated for the present invention, the mirror will have a reflecting surface that is characterized by a largest dimension which is in a range approximately between one millimeter and twenty millimeters.

Structurally, the actuator of the present invention includes a base, and it has a rigid post that is mounted on the base to extend outwardly therefrom. A flexible connector is affixed to the end of the post that extends from the base. More specifically, this flexible connector is preferably made of an elastomeric material, such as silicone or rubber, which is capable of repetitively withstanding an extremely large number of cycles, while exhibiting substantially "zero" fatigue. Together, the post and the flexible connector establish a flexible universal pivot for the actuator.

An annular shaped permanent magnet is attached to the backside (non-reflective side) of the mirror, and is centered on the universal pivot around the permanent magnet. More specifically, the flexible connector is attached to the permanent magnet. With this connection the mirror is effectively mounted for pivotal movement on the flexible connector.

In addition to the structure mentioned above, the actuator of the present invention includes at least one electromagnetic device that can be controlled to tilt the mirror about an axis, while the mirror is attached to the flexible connector. Specifically, this electromagnetic device includes an electric coil that is mounted on the base. Also, the device includes a voltage source for sending a current through the coil. This is done to create a magnetic field that will interact with the magnetic field of the permanent magnet. Depending on the current that is sent through the coil, the electromagnetic device can control the magnetic interconnection between the permanent magnet that is mounted on the mirror and the electromagnetic device that is mounted on the base. Thus, the electromagnetic device can control the amount the mirror is tilted. Preferably, the actuator of the present invention will have two such electromagnetic devices that will cooperate with each other to tilt the mirror about orthogonal axes.

For the operation of the actuator of the present invention, an x-y-z coordinate system can be established wherein the mirror is moveable in rotation through an angle θ around the x-axis, and in rotation through an angle φ around the y-axis. In this case, one of the electromagnetic devices is used to move the mirror through the angle θ around the x-axis, and the other electromagnetic device is used to move the mirror through the angle φ around the y-axis. Preferably, the angle θ is moveable through a range of ±10° and, similarly, the angle φ is moveable through a range of ±10°. For an alternate embodiment of the present invention, the mirror may have a curved (spherical) surface and, further, the mirror can be moved in translation along the z-axis.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
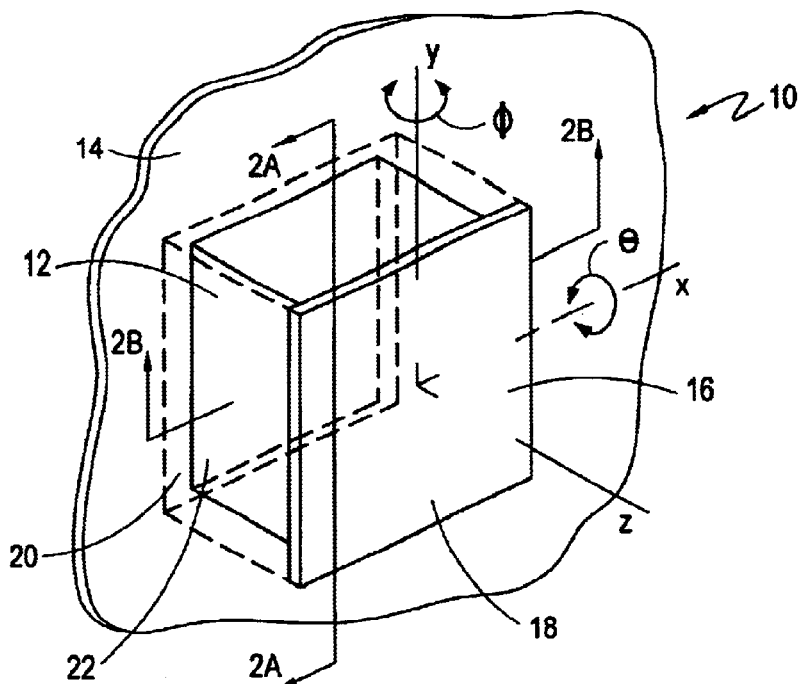
FIG. 1 is a perspective view of the present invention showing a mirror in combination with an actuator.

Referring initially to FIG. 1, a device in accordance with the present invention is shown and is generally designated 10. As shown, the device 10 includes an actuator 12 that is mounted or attached to a base (substrate) 14. A mirror 16, having a reflective surface 18, is mounted on the actuator 12 to distance the reflective surface 18 from the base 14. As indicated in FIG. 1, the projection of the reflective surface 18 onto the base 14 defines an area 20 on the base 14 that lies under the mirror 16. Further, the actuator 12 has a footprint 22 on the base 14. As intended for the present invention, the footprint 22 of the actuator 12 lies within the projected area 20 of the reflective surface 18 of the mirror 16. For purposes of the present invention, the reflective surface 18 has a maximum planar dimension in a range of approximately one to twenty millimeters.

Figure 2A:
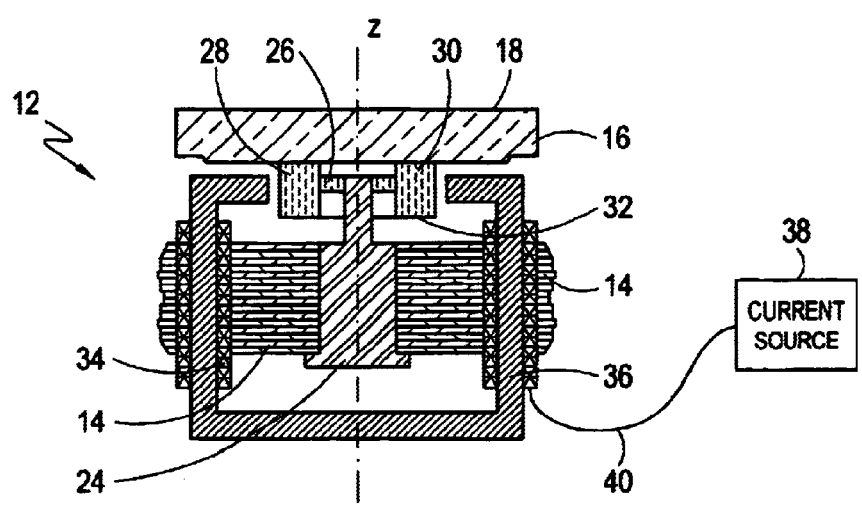
FIG. 2A is a cross-sectional view of the actuator-mirror combination as seen along the line 2A—2A in FIG. 1.

Referring now to FIG. 2A, the detail of structure for the actuator 12 will be more easily appreciated. In FIG. 2A it will be seen that a rigid post 24 is fixedly attached to the base 14. Also, it will be seen that a flexible connector (flexure) 26 is attached directly to the rigid post 24. Preferably, the connector 26 is made of an elastomeric material, such as silicone or rubber, that will experience little, if any, material fatigue when the connector 26 is minimally deformed. This should be so, even though the connector 26 may be subjected to repetitive cycles over extended periods of time (e.g. years of operation).

FIG. 2A also shows that an annular-shaped, permanent magnet 28 is mounted on the mirror 16. Specifically the permanent magnet 28 is mounted on, or attached to the side of the mirror 16 that is opposite the reflective surface 18. Further, the permanent magnet 28 is centered on the reflective surface 18 of the mirror 16 and, importantly, it is fixedly attached to the flexible connector (flexure) 26. Referring back to FIG. 1 for the moment, it will be seen that the actuator 12 and mirror 16 define a Cartesian x-y-z coordinate system. Within this coordinate system, it will be appreciated that both the rigid post 24 and the permanent magnet 28 are centered on the z-axis. Consequently, deformations of the connector (flexure) 26 will allow the mirror 16 to tilt at the same time around either or both the x-axis and the y-axis. More specifically, with this structure the mirror 16 is moveable in rotation through an angle θ around the x-axis, and in rotation through an angle φ around the y-axis. For purposes of the present invention the angle θ is moveable through a range of ±10°, and the angle φ is also moveable through a range of ±10°.

Still referring to FIG. 2A, it will be seen that the permanent magnet 28 is positioned on the mirror 16 with its North pole 30 adjacent the mirror 16, and its South pole 32 distanced from the mirror 16. The poles 30 and 32 could, of course, be reversed, depending upon design considerations. Importantly, however, is the fact that in the vicinity of the mirror 16 the magnetic field of the permanent magnet 28 will be substantially parallel to the z-axis. With this in mind, it is seen in FIG. 2A that the actuator 12 of the present invention also includes a selectively magnetic core 34 that is mounted on the base 14. Additionally, an electric coil 36 is wound around this core 34, and the coil 36 is connected with a current source 38 via line 40. Consequently, in a manner well known in the pertinent art, activation of the current source 38 will send an electrical current through the coil 36 that will, in turn, magnetize the core 34. Importantly, the magnetic field that is generated on the core 34 will be generally perpendicular to the z-axis in the vicinity of the mirror 16 and, thus, also perpendicular to the magnetic field of permanent magnet 28.

As will be appreciated by the skilled artisan, the magnetic interaction between the permanent magnet 28 and the core 34 (whenever core 34 is magnetized) will generate forces on the mirror 16 that will cause it to tilt. More specifically, depending on the direction of current through the coil 36, and the magnitude of this current, the tilt of mirror 16 can be controlled both in direction and in extent. As intended for the present invention, such an activation of the current source 38 will selectively move the mirror 16 in rotation through an angle θ around the x-axis to positions within a range of ±10°.

Figure 2B:
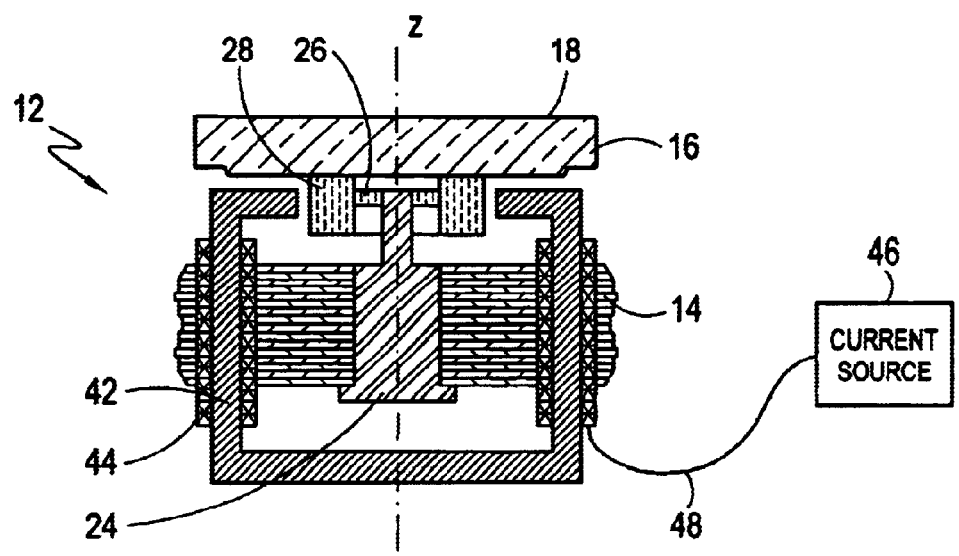
FIG. 2B is a cross-sectional view of the actuator-mirror combination as seen along the line 2B—2B in FIG. 1.

FIG. 2B, shows the same actuator 12 as seen in FIG. 2A, but from a different perspective. More specifically, just as FIG. 2A shows the electromagnetic mechanism for tilting mirror 16 around the x-axis, FIG. 2B is provided to show that a tilt of the mirror 16 can be individually or simultaneously made about the y-axis. For this purpose, a core 42, coil 44, current source 46 and line 48 are shown in FIG. 2B. These components will act together, in concert, as an electromagnetic mechanism that tilts the mirror 16 in rotation through an angle φ around the y-axis, within a range of ±10°.

Figure 3:
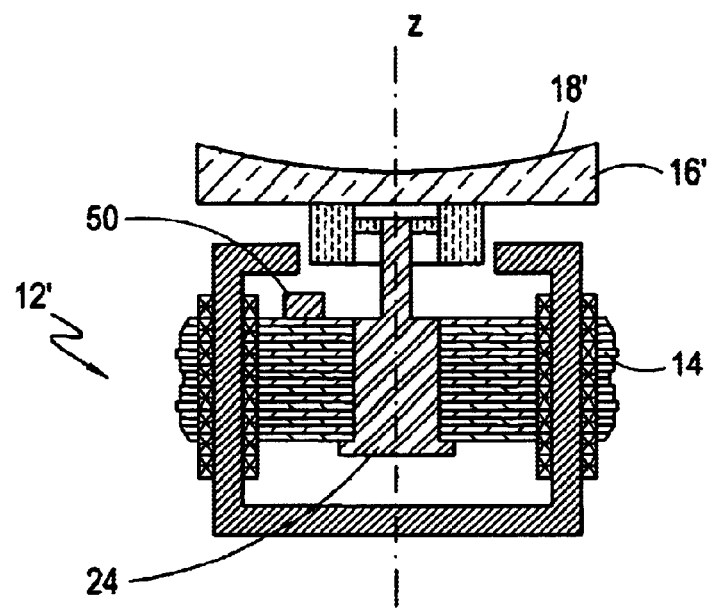
FIG. 3 is a cross-sectional view of an alternate embodiment of an actuator-mirror for use with the present invention wherein the mirror has a curved (spherical) reflective surface.

An alternate embodiment for the present invention is shown in FIG. 3. In all important respects, the actuator 12' of the alternate embodiment is essentially the same as was disclosed above for the actuator 12. The actuator 12', however, is used to move a mirror 16' which has a curved reflective surface 18'. Additionally, FIG. 3 shows that a Hall Effect device 50, of a type well known in the pertinent art, can be employed in several different configurations with the present invention for well known purposes. This is so for both the actuator 12 and actuator 12'. Further, depending on the particular application, it is anticipated that it may be desirable to move the mirror 16 or mirror 16' along the z-axis. In any event, it is anticipated that the actuator 12 of the present invention may be used for a variety of applications wherein it is desirable to redirect small beams of light from one light path to another, such as in the operation of a photonic switch.

While the particular Optical Beam Steering Device as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An actuator for moving a mirror, wherein said mirror defines an x-y-z coordinate system and has a reflecting surface in an x-y plane characterized by a largest dimension of less than twenty millimeters to define an area, wherein said actuator defines a footprint within said area, and wherein said actuator comprises:
   a base;
   a flexible universal pivot substantially centered on said mirror for mounting said mirror on said base at a substantially constant distance therefrom;
   a first magnetic means mounted on said base;
   a second magnetic means attached to said mirror for establishing a magnetic interconnection between said mirror and said base; and
   an electronic means for controlling said magnetic interconnection to selectively move said mirror on said universal pivot in rotation through an angle $\theta$ around the x-axis, and in rotation through an angle $\phi$ around the y-axis, from a first orientation relative to said base into a second orientation relative to said base.

2. An actuator as recited in claim 1 wherein said second magnetic means is a substantially annular shaped permanent magnet and is centered on said universal pivot.

3. An actuator as recited in claim 2 wherein said first magnetic means is electromagnetic and comprises:
   a selectively magnetic core mounted on said base;
   an electrical coil wound around said core; and
   a voltage source electrically connected to said coil for sending a current through said coil to magnetize said core to control said magnetic interconnection between said mirror and said base.

4. An actuator as recited in claim 2 wherein said universal pivot comprises:
   a rigid post mounted on said base to extend therefrom; and
   a flexible connector affixed to said post and attached to said permanent magnet to allow for movement of said mirror relative to said base with substantially no fatigue flexure for said connector.

5. An actuator as recited in claim 4 wherein said first magnetic means is an electromagnetic system comprising:
   a first coil mounted on said base and connected to said electronic means for controlling current through said first coil to move said mirror through the angle $\theta$ around the x-axis; and
   a second coil mounted on said base and connected to said electronic means for controlling current through said second coil to move said mirror through the angle $\phi$ around the y-axis.

6. An actuator as recited in claim 5 wherein the angle $\theta$ is moveable through a range of ±10°, and the angle $\phi$ is moveable through a range of ±10°.

7. An actuator as recited in claim 1 wherein said area of said mirror is characterized by a dimension in a range approximately between one millimeter and twenty millimeters.

8. An actuator for moving a mirror, wherein said mirror defines an x-y-z coordinate system and has a reflecting surface in an x-y plane characterized by a largest dimension of less than twenty millimeters to define an area, and wherein said actuator defines a footprint within said area, and wherein said actuator comprises:
   a mechanical means substantially centered on said mirror for mounting said mirror on a base at a substantially constant distance therefrom for pivotal movement thereon;
   a magnetic means interconnecting said mirror with said base; and
   an electronic means for controlling said magnetic means to selectively move said mirror relative to said base via said mechanical means in rotation through an angle $\theta$ around the x-axis, and in rotation through an angle $\phi$ around the y-axis.

9. An actuator as recited in claim 8 wherein said mechanical means is a universal pivot.

10. An actuator as recited in claim 9 wherein said magnetic means comprises:
    a permanent magnet attached to said mirror, said permanent magnet creating a first magnetic field; and
    an electromagnet mounted on said base to selectively generate a second magnetic field for interaction with said first magnetic field.

11. An actuator as recited in claim 10 wherein said permanent magnet is substantially annular shaped and is centered on said universal pivot, and further wherein said universal pivot comprises:
    a rigid post mounted on said base to extend therefrom; and
    a flexible connector affixed to said post and attached to said permanent magnet to allow for movement of said mirror relative to said base.

12. An actuator as recited in claim 10 wherein said electromagnet comprises:
    a coil mounted on said base; and
    a voltage source for sending a current through said coil to control said magnetic interconnection between said mirror and said base.

13. An actuator as recited in claim 10 wherein said electromagnet comprises:
    a first coil mounted on said base and connected to said electronic means for controlling current through said first coil to move said mirror through the angle $\theta$ around the x-axis in a range of ±10°; and
    a second coil mounted on said base and connected to said electronic means for controlling current through said second coil to move said mirror through the angle $\phi$ around the y-axis in a range of ±10°.

14. An actuator as recited in claim 13 wherein said area of said mirror is characterized by a dimension in a range approximately between one millimeter and twenty millimeters.

15. A method for manufacturing an actuator for moving a mirror, wherein said mirror defines an x-y-z coordinate system and has a reflecting surface in an x-y plane characterized by a largest dimension of less than twenty millimeters to define an area, wherein said actuator defines a footprint within said area, and wherein said method comprises the steps of:

attaching a permanent magnet to the mirror to establish a first magnetic field having a fixed relationship with the mirror;

positioning a universal pivot on a base and substantially centered on the mirror at a substantially constant distance therefrom;

mounting the mirror on the universal pivot with the permanent magnet centered on the universal pivot;

locating an electromagnet on the base to selectively generate a second magnetic field for interaction with the first magnetic field; and controlling the second magnetic field of the electromagnet to selectively move the mirror relative to the base via the universal pivot in rotation through an angle $\theta$ around the x-axis, and in rotation through an angle $\phi$ around the y-axis.

16. A method as recited in claim 15 wherein the positioning step comprises the steps of:

extending a rigid post from the base;

affixing a flexible connector to said post; and attaching the flexible connector to the permanent magnet to allow for movement of the mirror relative to the base.

17. A method as recited in claim 16 wherein the mirror defines an x-y-z coordinate system and is moveable in rotation through an angle $\theta$ around the x-axis, and is moveable in rotation through an angle $\phi$ around the y-axis, and wherein the locating step comprises the steps of:

mounting a first coil on the base;

connecting the first coil to a voltage source to control current from the voltage source through the first coil to move the mirror through the angle $\theta$ around the x-axis in a range of $\pm 10°$;

mounting a second coil on the base; and connecting the second coil to the voltage source to control current from the voltage source through the second coil to move the mirror through the angle $\phi$ around the y-axis in a range of $\pm 10°$.

* * * * *

UNITED STATES PATENT AND TRADEMARK OFFICE
CERTIFICATE OF CORRECTION

PATENT NO. : 6,813,055 B2
DATED : November 2, 2004
INVENTOR(S) : Edwin M. C. Childers, Richard G. Trissell and Stephen W. Horton It is certified that error appears in the above-identified patent and that said Letters Patent is hereby corrected as shown below:

<u>Title page,</u>
Item [75], Inventors, insert -- Stephen W. Horton --

Signed and Sealed this

Fifteenth Day of March, 2005

JON W. DUDAS
*Director of the United States Patent and Trademark Office*